US009397878B2

(12) United States Patent
Seth et al.

(10) Patent No.: US 9,397,878 B2
(45) Date of Patent: Jul. 19, 2016

(54) CROSS-PLATFORM MODULE THAT IS SHARED BY CLIENT APPLICATIONS FOR ACCESS TO RICH COMMUNICATIONS SUITE RESOURCES ON A CLIENT DEVICE

(71) Applicant: QUALCOMM Incorporated, San Diego, CA (US)

(72) Inventors: Ritesh Seth, San Diego, CA (US); Srinivasan Mecheri Govindarajan, San Diego, CA (US); Chanchal Rudraprasad, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 154 days.

(21) Appl. No.: 14/163,889

(22) Filed: Jan. 24, 2014

(65) Prior Publication Data

US 2014/0215078 A1 Jul. 31, 2014

Related U.S. Application Data

(60) Provisional application No. 61/758,136, filed on Jan. 29, 2013.

(51) Int. Cl.
*G06F 9/30* (2006.01)
*H04L 29/08* (2006.01)
(Continued)

(52) U.S. Cl.
CPC ............ *H04L 29/08468* (2013.01); *G06F 8/40* (2013.01); *G06F 8/51* (2013.01);
(Continued)

(58) Field of Classification Search
CPC ............... G06F 8/40; G06F 8/51; G06F 8/52; G06F 8/53; G06F 8/76; G06F 9/3017; G06F 9/45516; G06F 9/4552; H04L 63/00; H04L 67/2814; H04L 67/26; H04L 61/1594; G06Q 30/0207; H04W 4/001; H04W 4/16; H04W 76/026
See application file for complete search history.

(56) References Cited

U.S. PATENT DOCUMENTS

2005/0088983 A1   4/2005   Wesslen et al.
2010/0257539 A1  10/2010   Narayanan et al.
(Continued)

FOREIGN PATENT DOCUMENTS

TW      201007563 A    2/2010
WO      2013029230 A1  3/2013

OTHER PUBLICATIONS

International Search Report and Written Opinion—PCT/US2014/013236—ISA/EPO—May 27, 2014.
(Continued)

*Primary Examiner* — Le H Luu
(74) *Attorney, Agent, or Firm* — Muncy, Geissler, Olds & Lowe, P.C.

(57) ABSTRACT

In an embodiment, a client device running a particular OS or OS-version is provisioned with a rich communications suite (RCS) interface. The RCS interface mediates interactions between RCS client applications and RCS resources. The RCS interface interacts with the plurality of RCS client applications in a platform-independent manner using an RCS protocol, and the RCS interacts with the RCS resource in an OS-specific manner using an OS-specific RCS access protocol. The RCS interface translates application-originated RCS signaling that complies with the RCS protocol into the OS-specific RCS access protocol for delivery to the RCS resources, and the RCS interface likewise translates application-terminated signaling that complies with the OS-specific RCS access protocol into the RCS access protocol for delivery to one of the RCS client applications.

64 Claims, 11 Drawing Sheets

(51) Int. Cl.
*G06F 9/45* (2006.01)
*G06F 9/44* (2006.01)
*G06F 9/455* (2006.01)
*H04W 4/20* (2009.01)
*H04L 29/06* (2006.01)

(52) U.S. Cl.
CPC . *G06F 8/52* (2013.01); *G06F 8/53* (2013.01); *G06F 8/76* (2013.01); *G06F 9/3017* (2013.01); *G06F 9/4552* (2013.01); *G06F 9/45516* (2013.01); *H04L 65/1016* (2013.01); *H04L 67/32* (2013.01); *H04L 67/34* (2013.01); *H04W 4/203* (2013.01); *H04L 65/10* (2013.01)

(56) References Cited

U.S. PATENT DOCUMENTS

| | | | |
|---|---|---|---|
| 2011/0202501 A1* | 8/2011 | Lindgren | H04L 61/1594 707/608 |
| 2011/0249650 A1* | 10/2011 | Seppanen | H04W 76/026 370/331 |
| 2012/0072601 A1 | 3/2012 | Bharadwaj | |
| 2012/0084792 A1 | 4/2012 | Benedek et al. | |
| 2012/0096115 A1* | 4/2012 | McColgan | H04W 4/001 709/217 |
| 2012/0185561 A1* | 7/2012 | Klein | H04L 67/2814 709/217 |
| 2012/0311614 A1 | 12/2012 | Deanna et al. | |
| 2013/0117096 A1* | 5/2013 | Klein | G06Q 30/0207 705/14.39 |
| 2013/0208729 A1 | 8/2013 | Evans et al. | |
| 2013/0227014 A1 | 8/2013 | Song | |
| 2013/0268357 A1* | 10/2013 | Heath | H04L 63/00 705/14.53 |
| 2014/0075515 A1* | 3/2014 | McColgan | H04L 67/26 726/4 |
| 2014/0248928 A1* | 9/2014 | Ryu | H04W 4/16 455/566 |

OTHER PUBLICATIONS

"RCS-e—Advanced Communications: Services and Client Specification Version 1.2.2 Jul. 4, 2012; rcs-e_advanced_comms_specification_v1_2_2_approved", rcs-e_advanced_comms_specification_v1_2_2_approved, Open-Mobile Alliance (OMA), 4330 La Jolla Village Dr., Suite 110 San Diego, CA 92122; USA, Jul. 4, 2012, pp. 1-169, XP064166410, Retrieved from the Internet: URL:ftp/Public_documents/IOP/IOP-MEC/2012/ [retrieved on Sep. 6, 2012].

Taiwan Search Report—TW103103297—TIPO—Aug. 22, 2015.

* cited by examiner

CROSS-PLATFORM MODULE THAT IS SHARED BY CLIENT APPLICATIONS FOR ACCESS TO RICH COMMUNICATIONS SUITE RESOURCES ON A CLIENT DEVICE

CLAIM OF PRIORITY UNDER 35 U.S.C. §119

The present application for patent claims priority to U.S. Application No. 61/758,136 entitled "CROSS-PLATFORM MODULE THAT IS SHARED BY CLIENT APPLICATIONS FOR ACCESS TO RICH COMMUNICATIONS SUITE RESOURCES ON A CLIENT DEVICE", filed Jan. 29, 2013, which is assigned to the assignee hereof and is hereby expressly incorporated by reference herein in its entirety.

TECHNICAL FIELD

Embodiments of the invention relate to a cross-platform module that is shared by client applications for access to rich communications suite (RCS) functions on a client device.

OVERVIEW

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

Rich Communications Suite (RCS) in Internet Protocol (IP) Multimedia Subsystem (IMS) is a recently developed service-type in the IMS domain. RCS generally refers to a set of communication services by which a client device (e.g., a mobile device or a fixed device) can update the capabilities of the contacts in its address book in real-time and thus enable "rich communication", such as Voice over LTE (VoLTE), video calls, Instant Messaging (IM), file or image sharing, etc., based on the real-time capabilities of the contacts. However, while low-level operating system (OS) resources can be leveraged by client applications to implement RCS-services, each client application typically must be customized for operation on a particular platform on which it will execute. For example, a client application configured for operation on Android OS devices needs to be coded by its developer to leverage any available Android-specific RCS OS resources, a client application configured for operation on Windows OS devices needs to be coded by its developer to leverage any available Windows-specific RCS OS resources, a client application configured for operation on iOS devices needs to be coded by its developer to leverage any available iOS-specific RCS OS resources, and so on.

BRIEF SUMMARY OF SOME SAMPLE EMBODIMENTS

In an embodiment, a client device running a particular OS or OS-version is provisioned with a rich communications suite (RCS) interface. The RCS interface mediates interactions between RCS client applications and RCS resources. The RCS interface interacts with the plurality of RCS client applications in a platform-independent manner using an RCS protocol, and the RCS interacts with the RCS resource in an OS-specific manner using an OS-specific RCS access protocol. The RCS interface translates application-originated RCS signaling that complies with the RCS protocol into the OS-specific RCS access protocol for delivery to the RCS resources, and the RCS interface likewise translates application-terminated signaling that complies with the OS-specific RCS access protocol into the RCS access protocol for delivery to one of the RCS client applications.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
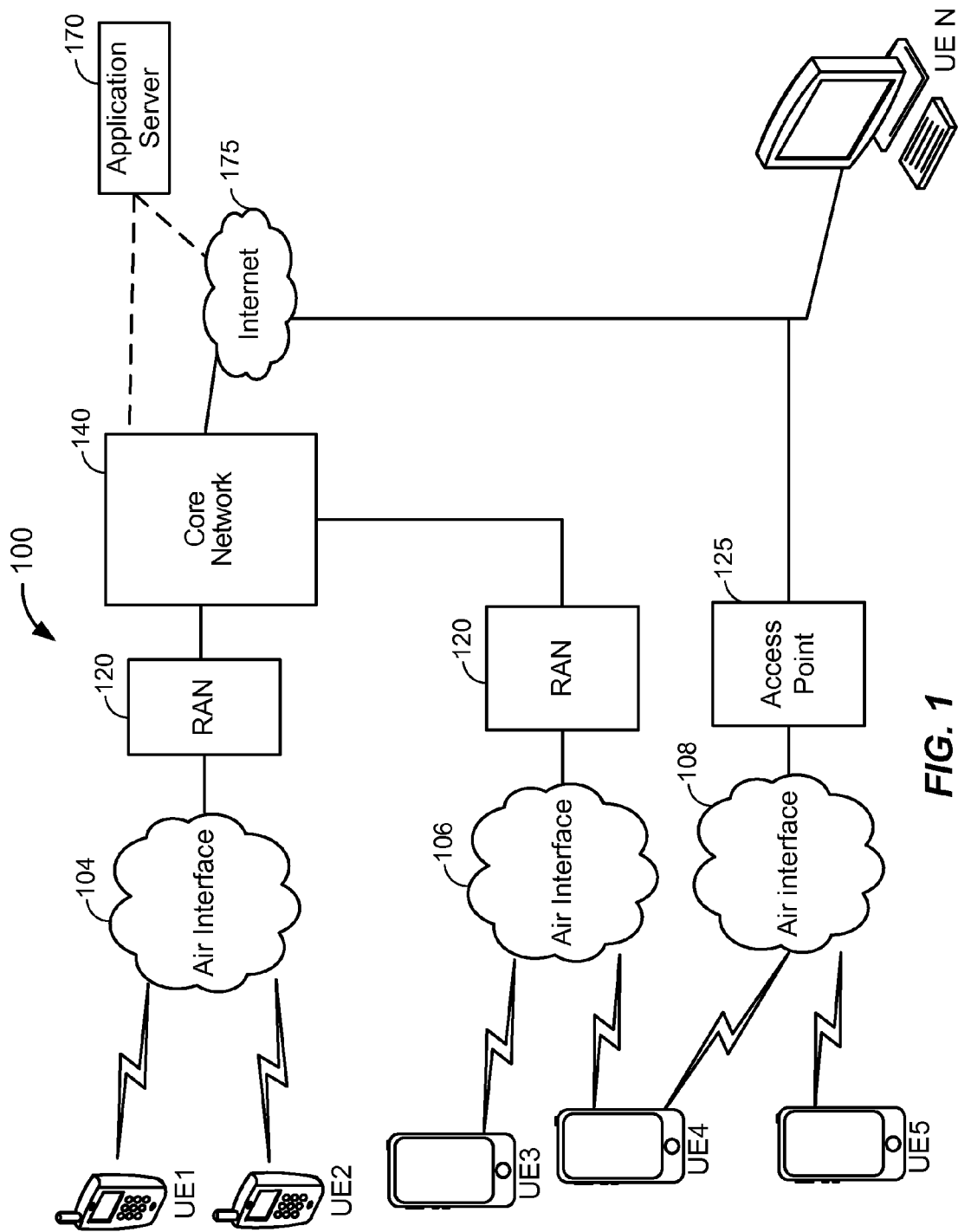
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
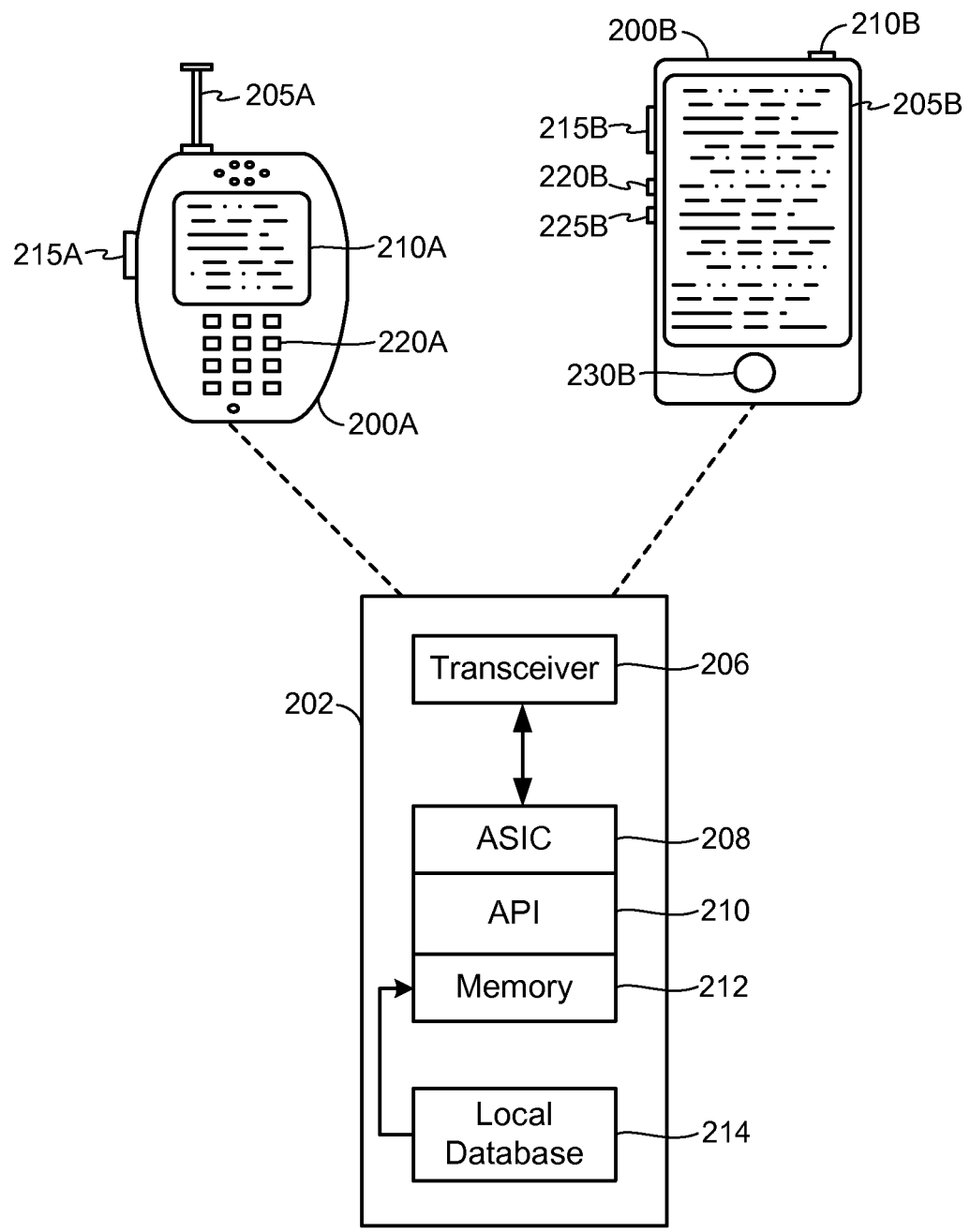
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
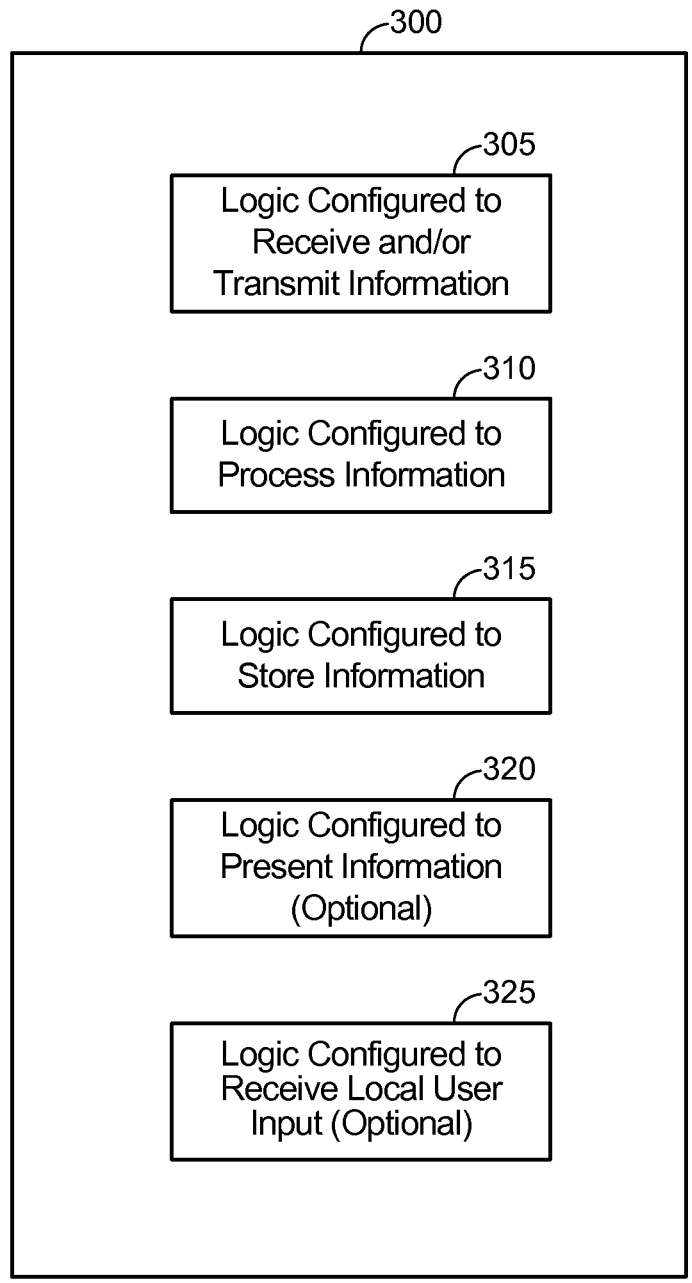
FIG. 3 illustrates a communication device that includes logic configured to perform functionality in accordance with an embodiment of the invention.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Rich Communications Suite (RCS) in Internet Protocol (IP) Multimedia Subsystem (IMS) is a recently developed service-type in the IMS domain. RCS generally refers to a set of communication services by which a client device (e.g., a mobile device or a fixed device) can update the capabilities of contacts in its address book in real-time and thus enable "rich communication." This can include, for example, Voice over LTE (VoLTE), video calls, Instant Messaging (IM), file or image sharing, etc., based on the real-time capabilities of the contacts.

While low-level operating system (OS) resources can be leveraged by client applications to implement RCS-services, each client application typically must be customized for operation on a particular platform on which it will execute. For example, a client application configured for operation on Android OS devices needs to be coded by its developer to leverage any available Android-specific RCS OS resources, a client application configured for operation on Windows OS devices needs to be coded by its developer to leverage any available Windows-specific RCS OS resources, a client application configured for operation on iOS devices needs to be coded by its developer to leverage any available iOS-specific RCS OS resources, and so on. Also, a client application configured for operation on client devices with different versions of an OS (e.g., iOS, Android, etc.) needs to be coded by its developer to leverage any available OS-specific RCS OS resources for that version (e.g., iOS 6 and iOS 7 may have different RCS access protocols that necessitate iOS Apps to be updated when the iOS is transitioned from version 6 to version 7). So, as used herein, "OS-specific" can be used as a reference to a specific type of OS (as distinguished from other OS-types) or alternatively a specific version of a specific OS (as distinguished from other OS-types as well as other versions of the same OS-type).

Today, consumers are experiencing the power and the promise of enriched communication. Services and applications that have introduced buddy lists showing dynamically changing status and on-line capabilities, different messaging options, and possibilities of adding content are just a few examples of the RCS experience. These capabilities are available on both PCs and mobile devices (either of which can be referred to as UEs herein), with open communication between devices and networks.

Figure 4:
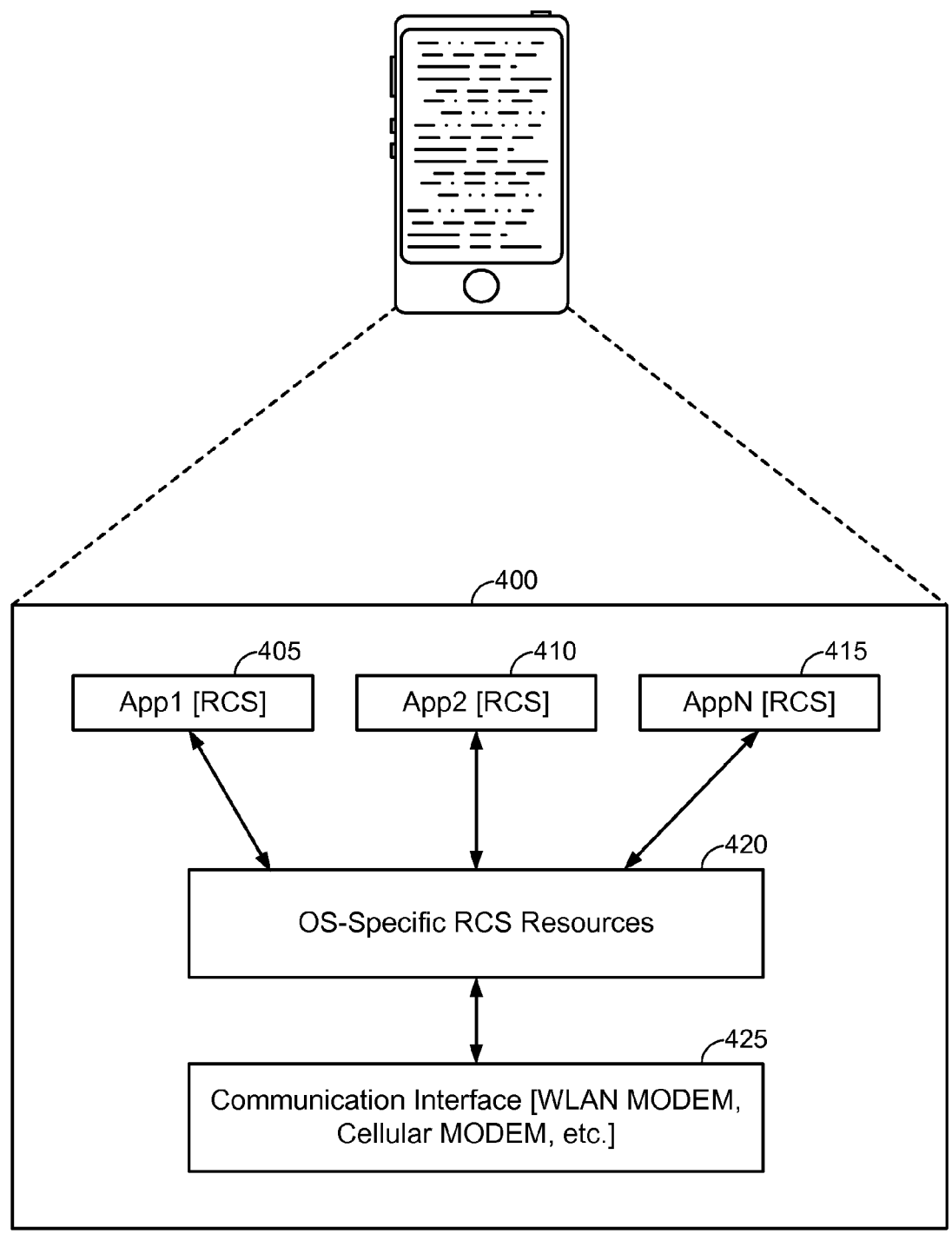
FIG. 4 illustrates a high-level perspective of a conventional RCS rich communication suite (RCS) architecture for a UE.

FIG. 4 illustrates a high-level perspective of a conventional RCS architecture 400 for a UE. The conventional RCS architecture 400 shown in FIG. 4 is generic to OS-type, such that the RCS architecture 400 can be implemented on a UE configured with Android OS, Windows OS, iOS, different versions of any of the aforementioned OS-types, etc.

Referring to FIG. 4, the RCS architecture 400 includes a plurality of client applications 405-415 (or Apps 1 . . . N) configured to directly access OS-specific RCS resources 420 on the UE. In other words, Apps 1 . . . N include code, written and tested by their respective developers, to implement the particular RCS resource signaling required to access the RCS resources on the OS of the UE on which they are deployed. Generally, the manner in which RCS resources are accessed is specific to the OS, such that an Instant Messaging application on an Android OS device cannot access RCS resources using the same signaling protocol as would be required on a Windows OS device. The OS-specific RCS resources 420 can interact with a communications interface 425 (e.g., a WLAN MODEM, a cellular MODEM, etc.) through which the RAN 120 or AP 125 can be accessed for interacting with network-side RCS resources. The RCS architecture 400 shown in FIG. 4 can correspond to a multi-processor environment in at least one implementation, whereby processing tasks are divided between an application processor and a separate modem processor on the client device or UE.

Figure 5A:
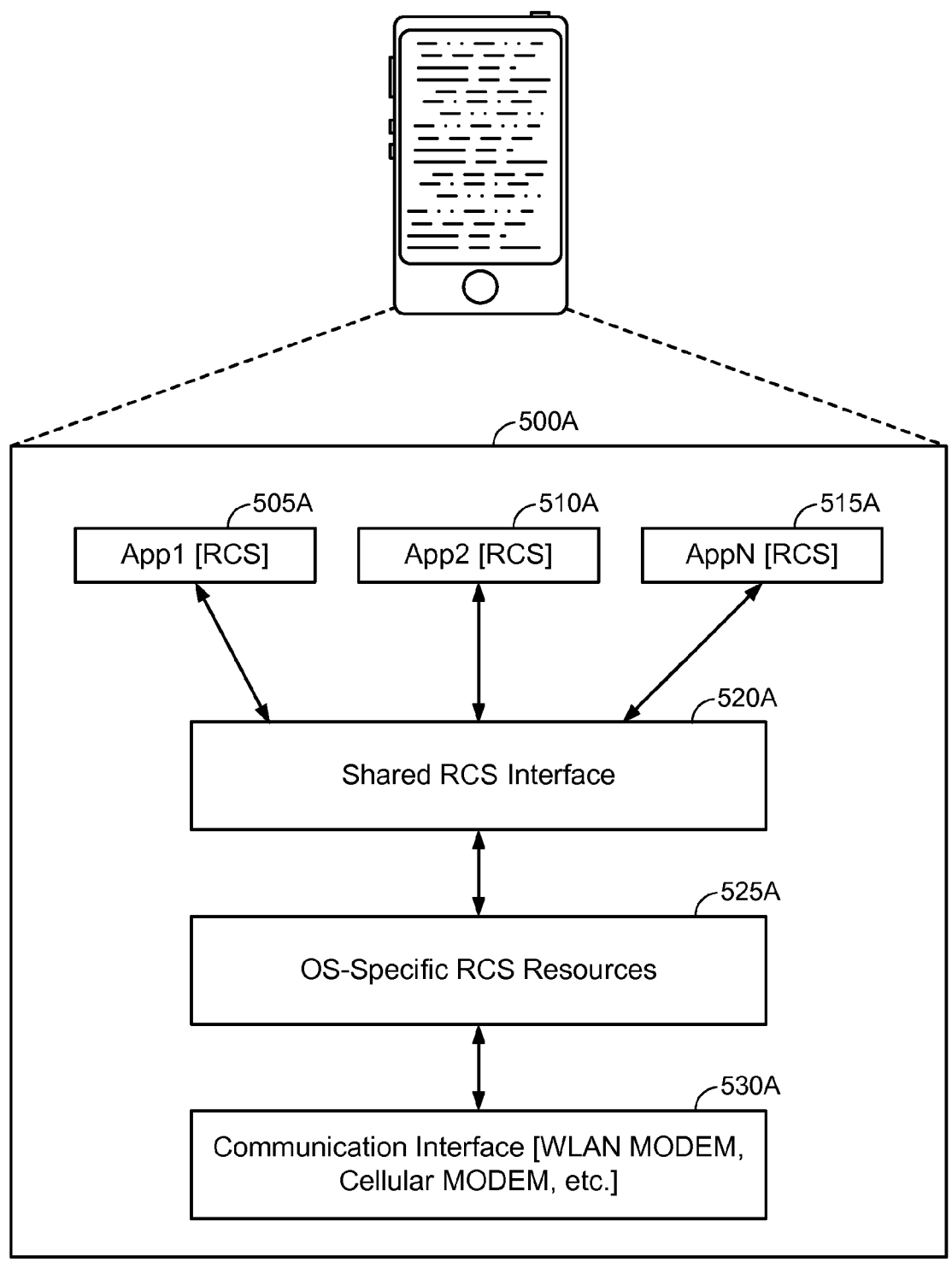
FIG. 5A illustrates a high-level perspective of an RCS architecture for a UE in accordance with an embodiment of the invention.

FIG. 5A illustrates a high-level perspective of an RCS architecture 500A for a UE in accordance with an embodiment of the invention. The RCS architecture 500A shown in FIG. 5A is generic to OS-type. As a result, the RCS architecture 500A can be implemented on a UE configured with varying OS types and/or OS versions, including, for example, Android OS, Windows OS, iOS v6.0, iOS v7.0, etc. Other OS types and/or versions may also be utilized.

Referring to FIG. 5A, the RCS architecture 500A includes a plurality of client applications 505A-515A (or Apps 1 . . . N) configured to access a shared RCS interface 520A, through which OS-specific RCS resources 525A are accessed. In an example, the shared RCS interface 520A can be implemented as a set of APIs that is made available to Apps 1 . . . N via a common protocol ("cross-platform RCS interface protocol").

The cross-platform RCS interface protocol used by Apps 1 . . . N to communicate with the shared RCS interface can be the same irrespective of the OS-type, OS-version or platform of the client device. Thus, in an example, a developer that develops an Instant Messaging application for implementation on an Android OS device can write code pertaining to RCS access that is re-used for implementation of the Instant Messaging application on an iOS device or Windows OS device. Developers are able to generate cross-platform code in this manner because the shared RCS interface 520A itself is configured to map the OS-specific RCS resource access protocol to the cross-platform RCS interface protocol for communicating between Apps 1 . . . N and the shared RCS interface 520A. Accordingly, the shared RCS interface 520A will be implemented in a different manner between platforms, but the cross-platform RCS resource access protocol is maintained the same to simplify the development process for the RCS client applications. In other words, unlike FIG. 4, Apps 1 . . . N in FIG. 5A do not need to each be hardcoded, by their respective developers, with the particular RCS resource signaling protocol required to access the RCS resources on the OS of the UE on which they are deployed, but can instead use the shared cross-platform RCS resource access protocol via interaction with the shared RCS interface 520A and rely upon the shared RCS interface 520A for the lower-level OS-specific RCS protocol conversion.

Referring to FIG. 5A, the OS-specific RCS resources 525A can interact with a communications interface 530A (e.g., a WLAN MODEM, a cellular MODEM, etc.) through which the RAN 120 or AP 125 can be accessed for interacting with network-side RCS resources. The RCS architecture 500A shown in FIG. 5A can correspond to a multi-processor environment in at least one implementation, whereby processing tasks are divided between an application processor and a separate modem processor on the UE.

According to some embodiments, Apps 1 . . . N may operate in accordance with certain rules governing their operation in order to operate in compliance with the shared RCS interface 520A. These rules may include one or more of:

Apps 1 . . . N on the bootup;
Service Start/Stop functionality cannot be controlled by Apps 1 . . . N;
Every service shall have a concept of Listeners. Listeners are to update Apps 1 . . . N for network level notifications for that service;
Every service shall have a concept of Sessions and Session Listener;
Sessions life cycles are maintained within the lifecycle of a service;
Session Listeners are used for network level notifications to Apps 1 . . . N;
Common configuration for RCS, such as (i) which PDN to use, and (ii) where to get the basic configuration (e.g., HTTP or SIM or hardcoded non-volatile memory on the device).

Further, versioning may play an important role for the shared RCS interface 520A. For example, a first set of APIs that constitute the shared RCS interface 520A may be marked as Version 1. Version 1 RCS interfaces may be based on RCS-Enhanced (RCS/E) and do not have Presence or Open Mobile Alliance (OMA) Converged IP Messaging (CPM) support. A second set of APIs that constitute a different shared RCS interface 520A may be marked as Version 2 with presence support and/or OMA CPM support. In this example, if one of Apps 1 . . . N at "runtime" needs to decide before its initialization which API set version is supported by the shared RCS interface 520A on the device for its own initialization then that can be achieved by querying the device for its supported version set. Version of "API Set" can also factor into the real world environment where one operator specifies the use of different RCS features, e.g., X-features vs. Y-Features.

In some scenarios, a service implementation of the shared RCS interface 520A (e.g., AIDL 520B or RCS API wrapper 520C) can be an RCS implementation running on a device in the form of service and any application can use/share RCS functionality. An advantage to a service implementation is that irrespective of whether the shared RCS interface 520A is a $3^{rd}$ party app or an OEM app, service is ready to serve multiple clients. With this feature, developers can take advantage of already existing IM or File Share functionality from the device.

Another option for implementation of the shared RCS interface 520A is a library implementation (as opposed to a service implementation). In a service implementation, application and service communication is based on platform supported Inter-process communication (IPC). From an application perspective, a service implementation of the shared RCS interface 520A is an API call but in actuality data is copied and transferred over the socket, which becomes a drawback for video buffering. Video buffers can be large in size compared to other API calls, so a library implementation for the shared RCS interface 520A can be used for implementations involving media. In some instances, a library implementation typically requires that the library be loaded locally in its own system, unlike services which can be distributed.

As discussed above, the shared RCS interface 520A can be configured for operation on devices that run different OSs, such as Java-based Android, C/COM based Windows, C-based QNX/IOS, different versions of the same OS, etc. The shared RCS interface 520A can be configured for each OS-type and/or OS-version such that the same access protocol can be used by developers for configuring the individual client applications, so that the developers do not need to concern themselves with the low-level OS requirements for interfacing with the OS-Specific RCS resources 525A.

The operation of the shared RCS interface 520A can be tested on different platforms. The tests can be implemented using automated API-specific tests or through an independent testing application. Unless automated, application testing is typically a manual effort which needs to be repeated manually for every device. However, an automated test suite for an API to test the shared RCS interface 520A on each platform can help to reduce the manual efforts of developers and results can be produced during nightly execution. An automated API test suite will also provide confidence to $3^{rd}$ party developers that a device will honor the contract of an API and it is certified as being compliant with the cross-platform RCS resource access protocol. The API test suite can be designed for operation on each relevant platform where the shared RCS interface 520A will be deployed, such as Java-based and C-based platforms. Also, the API test suite can also be used for Joyn certification process on any device.

APIs, such as the shared RCS interface 520A, are generally designed in a simulated environment on a computer, and then moved to the target deployment platform for actual testing. Thus, to help developers code their client applications for operating with the shared RCS interface 520A on each deployment platform (e.g., Android, Windows, etc.), a cross-platform SDK plug-in can be provided to the developers, which will help to permit their code development for compliance with the shared RCS interface 520A. After a particular client application is developed using the cross-platform SDK plugin, the client application can transition to a "Joyn Certified" device shall be seamless to a developer.

Figure 5B:
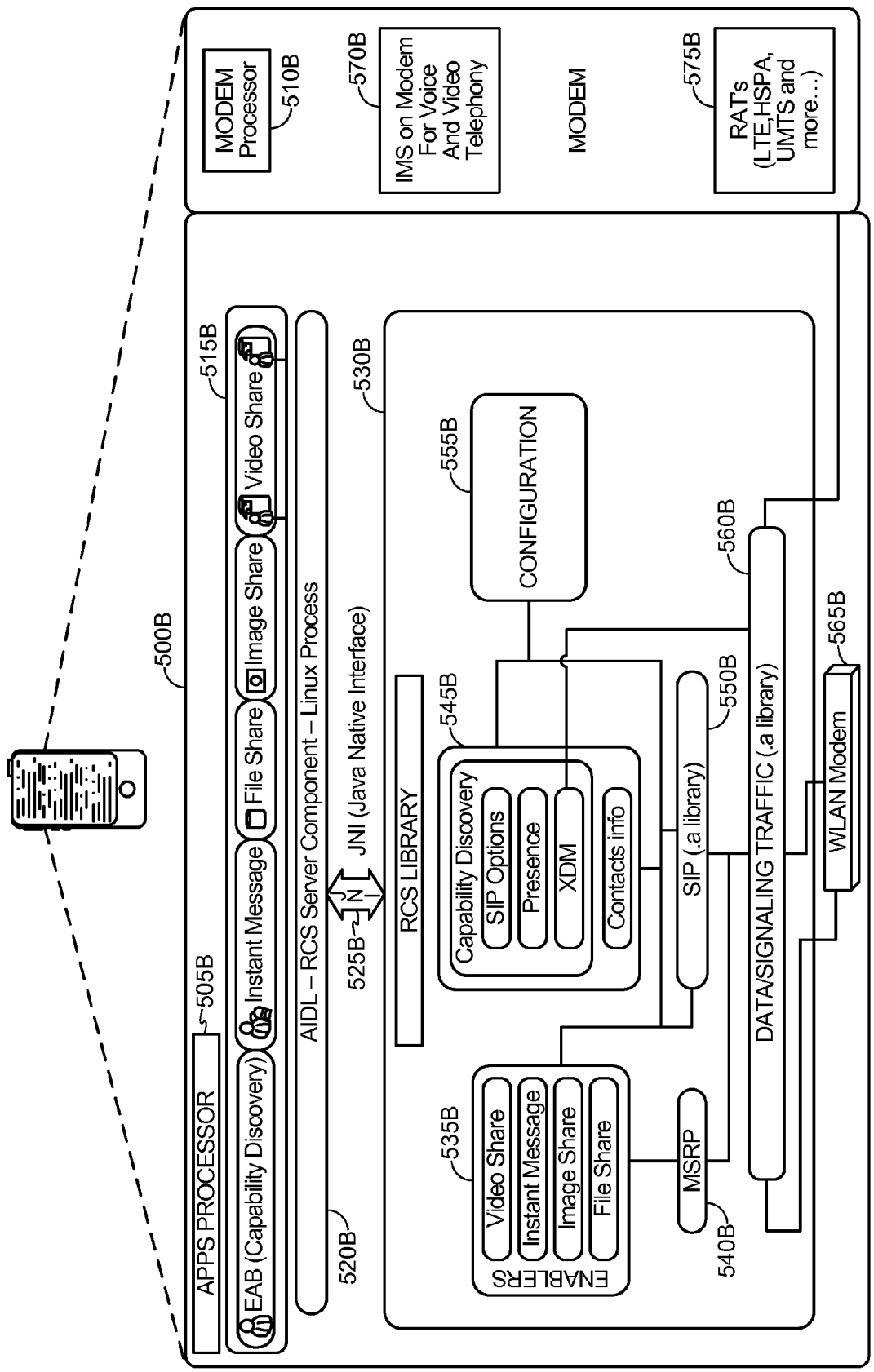
FIG. 5B illustrates an example of an Android RCS architecture in accordance with an embodiment of the invention.
Figure 5C:
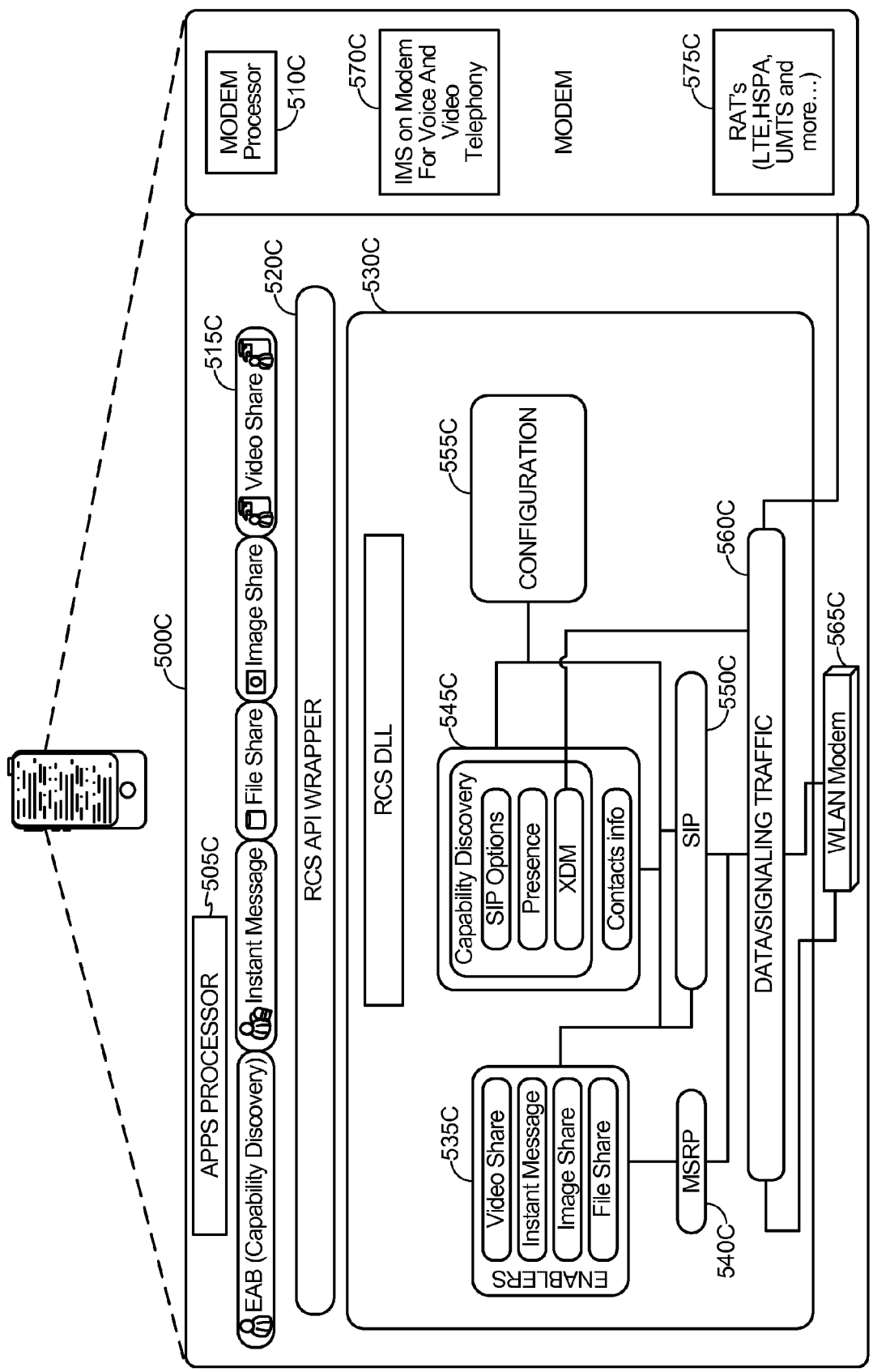
FIG. 5C illustrates an example of a Windows RCS architecture in accordance with an embodiment of the invention.

FIGS. 5B-5C illustrate OS-specific implementation examples of the high-level RCS architecture 500A of FIG. 5A. In particular, FIG. 5B illustrates an example of an Android RCS architecture 500B in accordance with an embodiment of the invention, and FIG. 5C illustrates an example of a Windows RCS architecture 500C in accordance with an embodiment of the invention.

Referring to FIG. 5B, the Android RCS architecture 500B is shown as partitioned between resources that are managed by an application processor 505B and resources that are managed by a modem processor 510B. With respect to the application processor side, a plurality of RCS client applications 515B are shown, which can correspond to Apps 1 . . . N from FIG. 5A. In particular, the plurality of RCS client applications 515B are shown to include an Enhanced Address Book (EAB) Capability Discovery (CD) client application, an IM client application, a File Share client application, an Image Share client application and a Video Share client application. In FIG. 5B, the shared RCS interface 520A corresponds to Android Interface Definition Language (AIDL) module 520B, which can be characterized as an RCS server component that is executed as a Linux process on the UE, and the AIDL module 520B is accessible to each of the plurality of RCS client applications 515B. The AIDL module 520B is configured to interact with Android OS-specific RCS resources 530B via a Java Native Interface (JNI) 525B. The Android OS-specific RCS resources 530B include, but are not limited to, a set of enablers 535B, a Message Session Relay Protocol (MSRP) module 540B, a Capability Discovery (CD) module 545B, a Session Initiation Protocol (SIP) module 550B, a configuration module 555B and a data/signaling traffic module 560B. The data/signaling traffic module 560B may form part of the communications interface 530A from FIG. 5A, which may further include WLAN modem 565B as well as an IMS on modem for voice and video telephony 570B and radio access technology (RAT) specific logic 575B implemented at the modem processor side. Generally, the components described above are configured to interact with each other over various communication paths, such as LTE signaling or data paths, WLAN signaling or data paths, XCAP/XDM for presence, etc.

Referring to FIG. 5C, the Windows RCS architecture 500C is shown as partitioned between resources that are managed by an application processor 505C and resources that are managed by a modem processor 510C. With respect to the application processor side, a plurality of RCS client applications 515C are shown, which can correspond to Apps 1 . . . N from FIG. 5A. In particular, the plurality of RCS client applications 515C are shown to include an EAB (capability discovery) client application, an IM client application, a File Share client application, an Image Share client application and a Video Share client application. In FIG. 5C, the shared RCS interface 520A corresponds to RCS API Wrapper module 520C, which can be accessed as an API by the respective RCS client applications 515C. The RCS API Wrapper module 520C can thereby be called by the RCS client applications 515C as needed to mediate interaction with Windows OS-specific RCS resources 530C. The Windows OS-specific RCS resources 530C include, but are not limited to, a set of enablers 535C, a Message Session Relay Protocol (MSRP) module 540C, a Capability Discovery module 545C, a Session Initiation Protocol (SIP) module 550C, a configuration module 555C and a data/signaling traffic module 560C. The data/signaling traffic module 560C may form part of the communications interface 530A from FIG. 5A, which may further include WLAN modem 565C as well as an IMS on modem for voice and video telephony 570C and radio access technology (RAT) specific logic 575C implemented at the modem processor side. Generally, the components described above are configured to interact with each other over various communication paths, such as LTE signaling or data paths, WLAN signaling or data paths, XCAP/XDM for presence, etc.

Figure 6A:
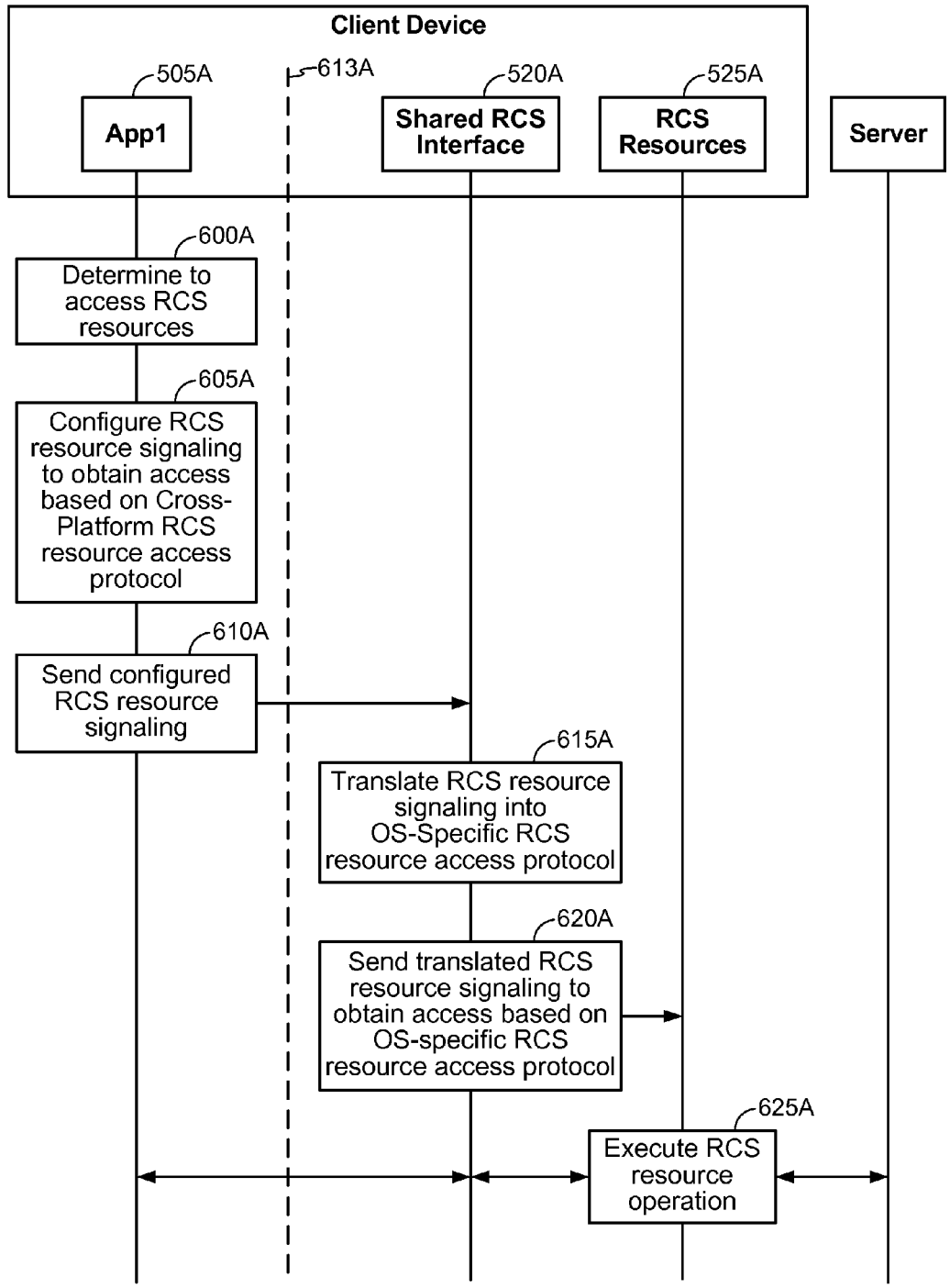
FIG. 6A illustrates a process by which RCS resource signaling is conveyed from an RCS client application to operating system (OS)-specific RCS resources on an associated UE via a shared RCS interface in accordance with an embodiment of the invention.

FIG. 6A illustrates a process by which RCS resource signaling is conveyed from an RCS client application ("App1") to OS-specific RCS resources 525A on an associated UE (or client device) via the shared RCS interface 520A in accordance with an embodiment of the invention. Referring to FIG. 6A, assume that App1 is provisioned with code by its developer for implementing the cross-platform RCS resource access protocol, which is the same from platform to platform (e.g., OS-type to OS-type, OS-version to OS-version for the same OS-type, etc.). At 600A, App1 determines to access the OS-specific RCS resources 525A. For example, at 600A, App1 may determine to obtain the capabilities of its contacts and/or to announce its own capabilities to its contacts, App1 may be an IM client application that determines to change session membership or to send an IM, App1 may be an Image Share, Video Share or File Share application that determines to send an image, video or other file, etc.

Referring to FIG. 6A, instead of generating OS-specific (or natively supported) RCS resource signaling for implementing the RCS resource access determined at 600A, App1 configures the RCS resource signaling based on the cross-platform RCS resource access protocol, 605A, and then sends the configured RCS resource signaling to the shared RCS interface 520A, 610A. In an example, the OS that is running on the client device may be configured to automatically intercept messaging from App1 that is exchanged with the shared RCS interface 520A and apply an OS-specific wrapping thereto. Thus, the configured RCS resource signaling that is sent at 610A optionally undergoes the above-noted OS-specific wrapping as shown in FIG. 6A by dotted line 613A. As will be appreciated, this means that the signaling that actually arrives at the shared RCS interface 520A at 610A can potentially be in an OS-specific format that first requires the shared RCS interface 520A to "unwrap" the message in order to extract the configured RCS resource signaling that was initially formatted by App1 in compliance with the cross-platform RCS resource access protocol. Any OS-specific wrapping applied to messaging between App1 and the shared RCS interface 520A will typically be transparent to App1 and thereby does not need to be taken into account by a developer of App1. This permits the developer of App1 to devote its efforts to ensuring that App1 is compliant with the cross-platform RCS resource access protocol without specifically concerning itself with any OS-specific wrapping that may occur via interaction with the shared RCS interface 520A. The shared RCS interface 520A receives the configured RCS resource signaling and translates (or maps) the configured RCS resource signaling into conformance with the OS-specific RCS resource access protocol (i.e., the RCS resource access protocol that is natively supported on the OS that is running on the client device or UE), 615A, and the shared RCS interface 520A then sends the translated RCS resource signaling to the OS-specific RCS resources 525A to obtain the requested access for App1, 620A. In an example, the translation or mapping operation that occurs at 615A can be based on a look-up table that is configured to map cross-platform RCS resource signals to natively supported or OS-specific RCS resource signals that are used by the particular OS used on the relevant platform for this particular client device (or UE). The OS-specific RCS resources 525A receives the translated RCS resource signaling that conforms with its OS-specific or native RCS resource access protocol and executes an RCS resource operation, 625A. The RCS resource operation executed at 625A can potentially involve interaction with a remote server (e.g., a presence server, an IM server, etc.), such as application server 170.

While FIG. 6A shows how RCS resource signaling from individual RCS client applications (such as App1) can be mediated by the shared RCS interface 520A, it will be appreciated that RCS resource signaling can also flow from the OS-specific RCS resources 525A to App1, as described below with respect to FIG. 6B.

Figure 6B:
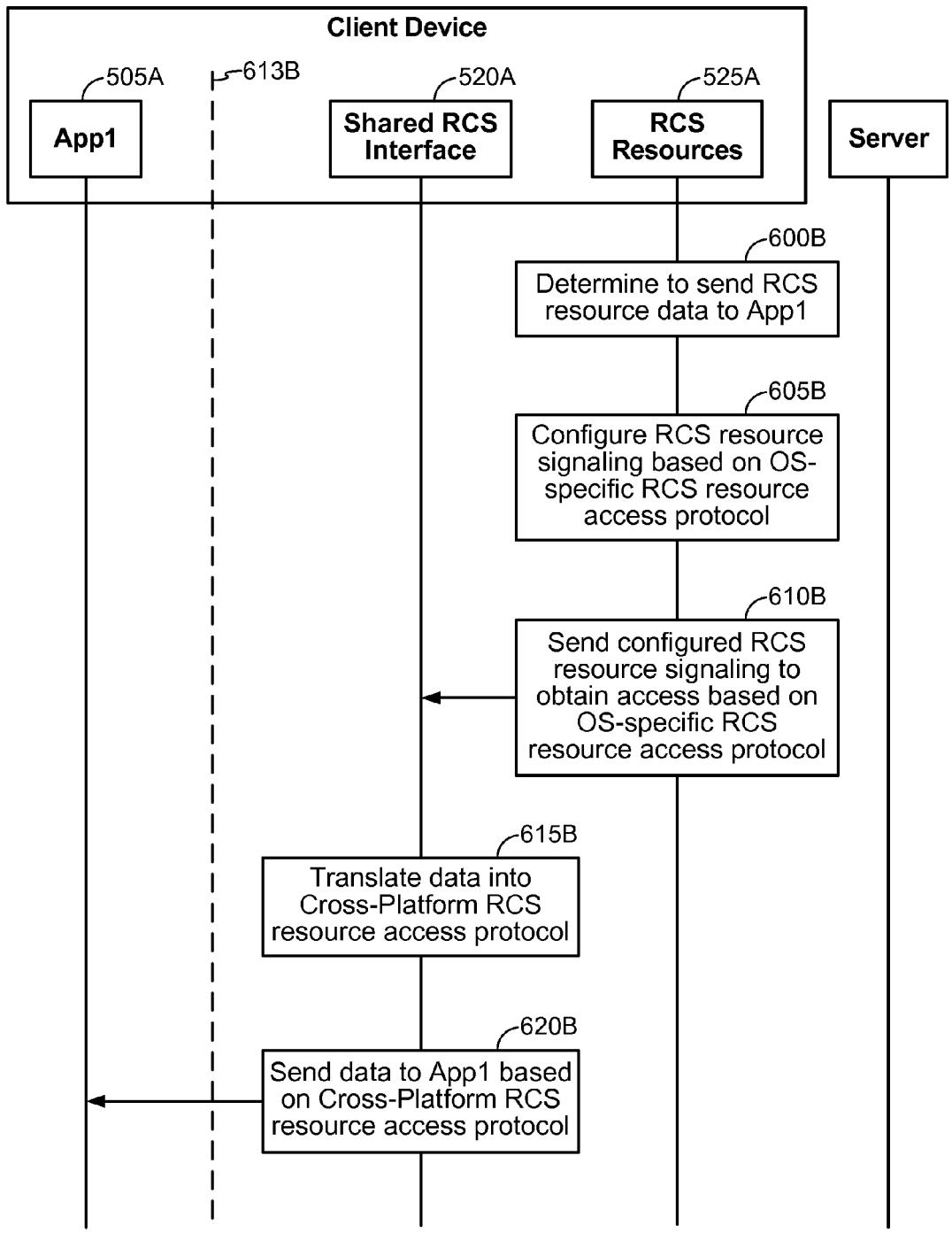
FIG. 6B illustrates a process by which RCS resource signaling is conveyed from the OS-specific RCS resources on the associated UE to an RCS client application via the shared RCS interface in accordance with an embodiment of the invention.

FIG. 6B illustrates a process by which RCS resource signaling is conveyed from the OS-specific RCS resources 525A on an associated UE (or client device) to an RCS client application ("App1") via the shared RCS interface 520A in accordance with an embodiment of the invention. Referring to FIG. 6B, assume that App1 is provisioned with code by its developer for implementing the cross-platform RCS resource access protocol, which is the same from platform to platform (e.g., OS-type to OS-type, OS-version to OS-version for the same OS-type, etc.). At 600B, the OS-specific RCS resources 525A determine to send RCS resource data to App1. For example, at 600B, the OS-specific RCS resources 525A may determine to deliver capability information for one or more of App1's contacts, App1 may be an IM client application and the OS-specific RCS resources 525A may determine to deliver session membership or status information and/or to an IM to App1, App1 may be an Image Share, Video Share or File Share application and the OS-specific RCS resources 525A may determine to deliver an image, video or other file, etc., to App1, and so on.

Referring to FIG. 6B, the OS-specific RCS resources 525A generate RCS resource signaling for conveying the RCS resource data in accordance with the OS-specific (or natively supported) RCS resource access protocol as in the conventional art, 605B. However, unlike the conventional art, the OS-specific RCS resources 525A delivers the RCS resource signaling to the shared RCS interface 520A instead of directly delivering the RCS resource signaling to an RCS client application that is custom-coded to interpret the OS-specific RCS resource access protocol, 610B.

The shared RCS interface 520A receives the configured RCS resource signaling and translates (or maps) the configured RCS resource signaling into conformance with the cross-platform RCS resource access protocol (i.e., the RCS resource access protocol that is used between RCS client applications and shared RCS interfaces on a variety of platforms), 615B, and the shared RCS interface 520A then sends the translated RCS resource signaling to App1 to deliver the RCS resource data, 620B. In an example, the OS that is running on the client device may be configured to automatically intercept messaging from the shared RCS interface 520A that is exchanged with App1 and apply an OS-specific wrapping thereto. Thus, the configured RCS resource signaling that is sent at 620B optionally undergoes the above-noted OS-specific wrapping as shown in FIG. 6B by dotted line 613B. As will be appreciated, this means that the signaling that actually arrives at the shared RCS interface 520A at 620B can potentially be in an OS-specific format that first requires App1 to "unwrap" the message in order to extract the configured RCS resource signaling that was initially formatted by the shared RCS interface 520A in compliance with the cross-platform RCS resource access protocol. Any OS-specific wrapping applied to messaging between App1 and the shared RCS interface 520A will typically be transparent to App1 and thereby does not need to be taken into account by a developer of App1. This permits the developer of App1 to devote its efforts to ensuring that App1 is compliant with the cross-platform RCS resource access protocol without specifically concerning itself with any OS-specific wrapping (or unwrapping) that may occur via interaction with the shared RCS interface 520A. In an example, the translation or mapping operation that occurs at 615B can be based on a look-up table that is configured to map cross-platform RCS resource signals to natively supported or OS-specific RCS resource signals that are used by the particular OS used on the relevant platform for this particular client device (or UE).

While FIGS. 6A-6B illustrate example implementations that are generic in terms of the platform (or OS) on which they are implemented, examples of platform-specific implementations of FIGS. 6A and/or 6B will now be provided.

Figure 7A:
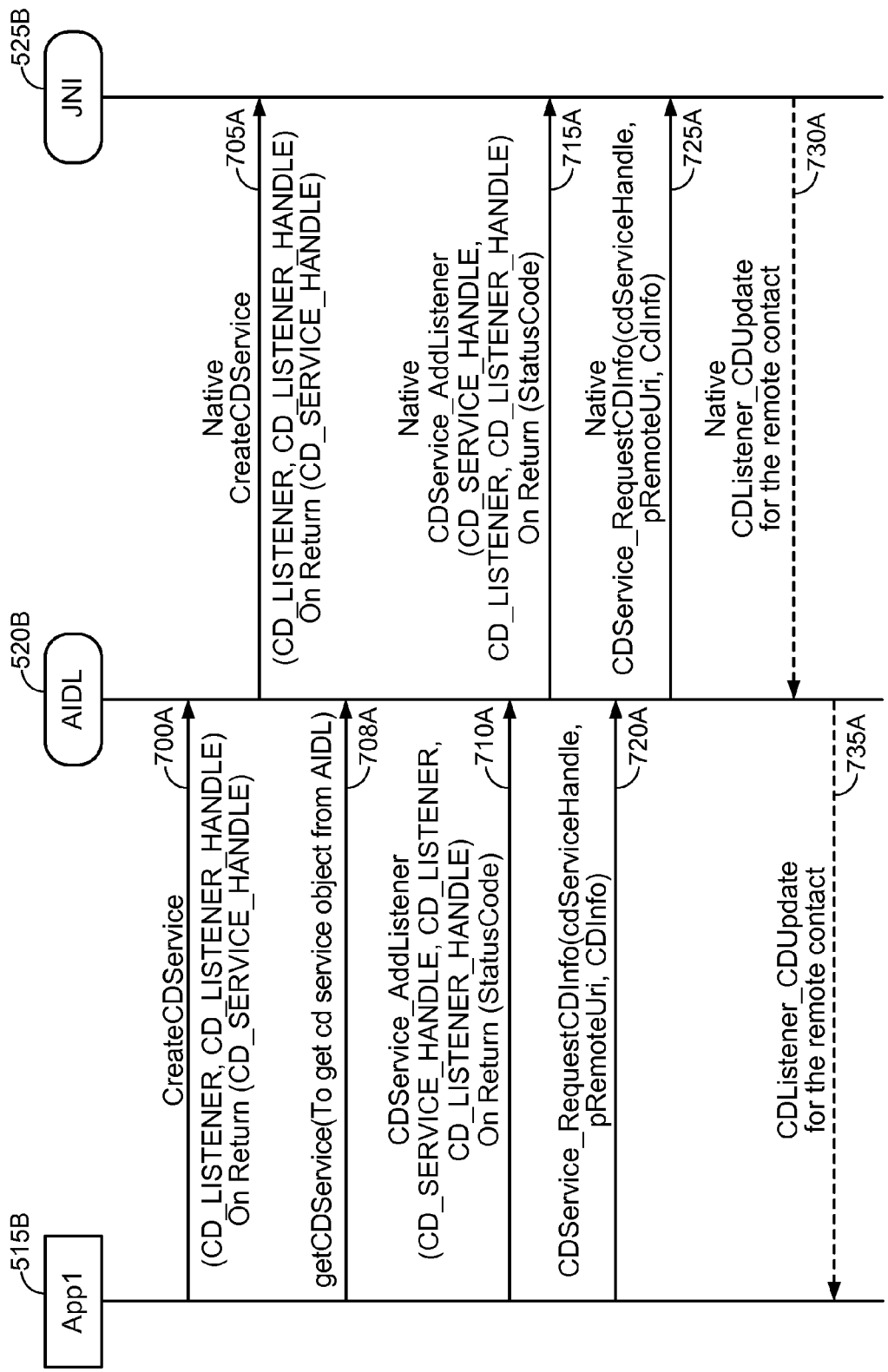
FIG. 7A illustrates an Android OS-specific implementation example of the process of FIGS. 6A-7B in accordance with an embodiment of the invention.

FIG. 7A illustrates an Android OS-specific implementation example of the process of FIGS. 6A-7B in accordance with an embodiment of the invention. Referring to FIG. 7A, the shared RCS interface 520A corresponds to AIDL module 520B, and the interface through which the AIDL module 520B accesses the Android OS-specific RCS resources 530B via the JNI 525B.

Referring to FIG. 7A, assume that the client device determines to implement a Capability Discovery (CD) function via the Android OS-specific RCS resources 530B at 600A. Under this assumption, App1 sends a CreateCDService message to instantiate the CD service in accordance with the cross-platform RCS resource access protocol to the AIDL module 520B, 700A (e.g., similar to 610A of FIG. 6A), and the AIDL module 520B translates the cross-platform CreateCDService message into a natively-used CreateCDService message that conforms to the Android-OS specific RCS resource protocol and then delivers the translated CreateCDService message to the Android OS-specific RCS resources 530B over the JNI 525B, 705A (e.g., similar to 620A of FIG. 6A). App1 also sends a cross-platform getCDservice message to the AIDL module 520B, 708A. In an example, the getCDservice message at 708A is a miss through the JNI 525B, and is thereby not translated and forwarded to the JNI 525B. App1 sends a cross-platform CDService_AddListener message for adding a contact to the CD service in accordance with the cross-platform RCS resource access protocol to the AIDL module 520B, 710A (e.g., similar to 610A of FIG. 6A), and the AIDL module 520B translates the cross-platform CDService_AddListener message into a natively-used CDService_AddListener message that conforms to the Android-OS specific RCS resource protocol and then delivers the translated CDService_AddListener message to the Android OS-specific RCS resources 530B over the JNI 525B, 715A (e.g., similar to 620A of FIG. 6A).

Referring to FIG. 7A, App1 sends a cross-platform RequestCDInfo message for request CD information regarding one or more of its contacts (or listeners) in accordance with the cross-platform RCS resource access protocol to the AIDL module 520B, 720A (e.g., similar to 610A of FIG. 6A), and the AIDL module 520B translates the cross-platform RequestCDInfo message into a natively-used RequestCDInfo message that conforms to the Android-OS specific RCS resource protocol and then delivers the translated RequestCDInfo message to the Android OS-specific RCS resources 530B over the JNI 525B, 725A (e.g., similar to 620A of FIG. 6A). In response to the RequestCDInfo message, the Android-OS specific RCS resources provides a natively used CDListener_CDUpdate message that provides the requested CD information for the contact(s) over the JNI 525B to the AIDL module 520B, 730A (e.g., as in 610B of FIG. 6B), and the AIDL module 520B translates the native RequestCDInfo message into a cross-platform RequestCDInfo message and then delivers the translated RequestCDInfo message to App1, 735A (e.g., similar to 620B of FIG. 6B).

While not shown explicitly in FIG. 7A, the cross-platform messages sent from App1 to the AIDL module 520B at 700A, 708A, 710A and/or 720A may be wrapped with an OS-specific wrapping that requires the AIDL module 520B to "unwrap" the incoming message in order to extract the cross-platform messages embedded within the wrapping. Similarly, while not shown explicitly in FIG. 7A, the cross-platform message sent from the AIDL module 520B to App1 at 735A may be wrapped with an OS-specific wrapping that requires App1 to "unwrap" the incoming message in order to extract the cross-platform message embedded within the wrapping.

Figure 7B:
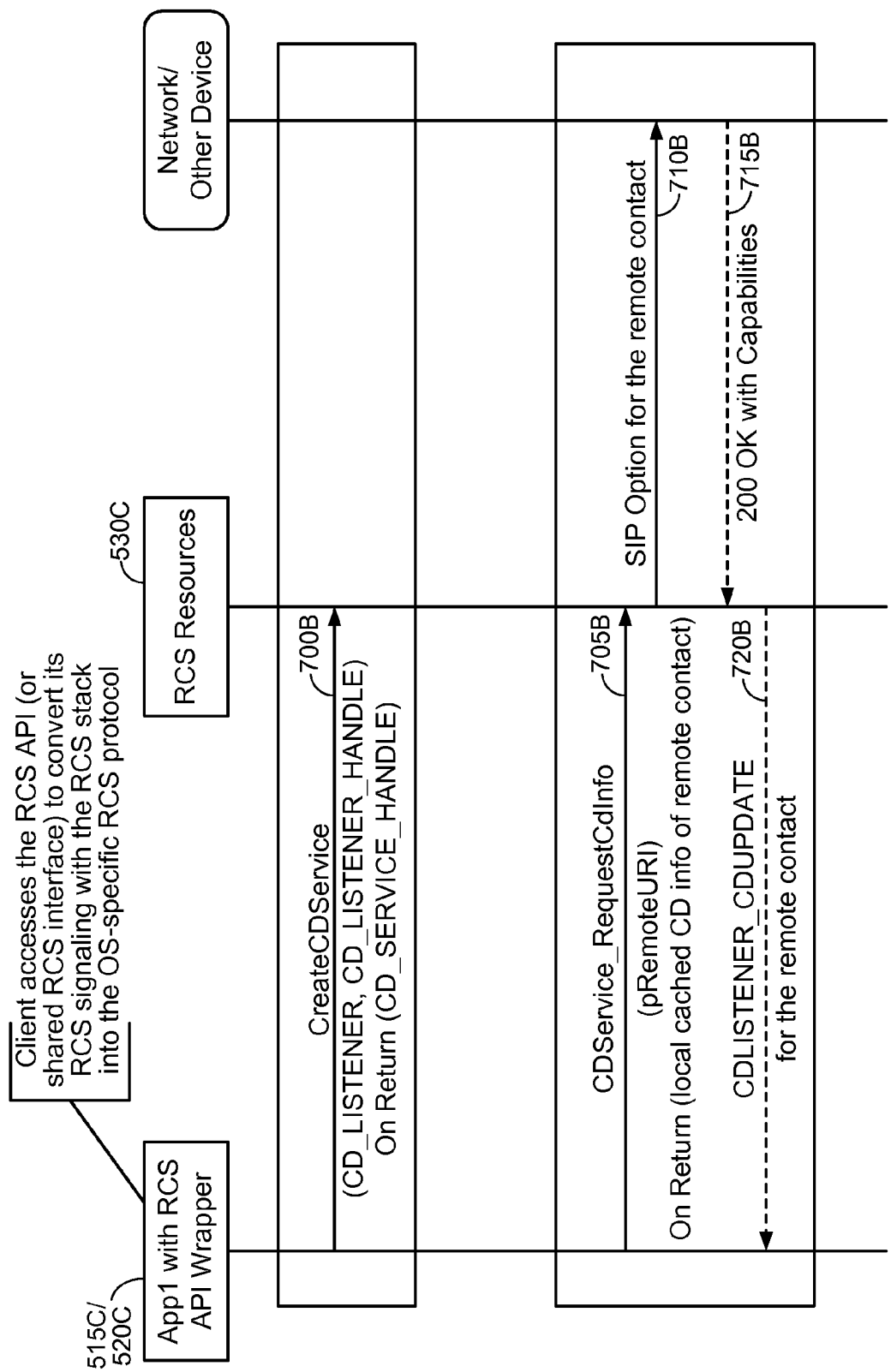
FIG. 7B illustrates a Windows OS-specific implementation example of the process of FIGS. 6A-7B in accordance with an embodiment of the invention.

FIG. 7B illustrates a Windows OS-specific implementation example of the process of FIGS. 6A-7B in accordance with an embodiment of the invention. Referring to FIG. 7B, the shared RCS interface 525A corresponds to the RCS API wrapper 520C, which can be leveraged by RCS client applications (such as App1) to translate cross-platform RCS resource signaling into natively supported RCS resource signaling for the Windows OS. In FIG. 7B, the above-noted cross-platform to Windows-specific RCS resource signaling translation occurs within the App1 execution via the RCS API wrapper 520C, such that the illustrate of both App1 and the RCS API wrapper 520C are consolidated into a single entity for the purpose of description.

Referring to FIG. 7B, assume that the client device determines to implement a Capability Discovery (CD) function via the Windows OS-specific RCS resources 530B at 600A. Under this assumption, App1, in conjunction with execution of the RCS API wrapper 520C, configures and sends a CreateCDService message to instantiate the CD service in accordance with the natively-supported RCS resource access protocol for Windows OS to the RCS resources 530C, 700B (e.g., similar to 610A-620A of FIG. 6A). App1, in conjunction with execution of the RCS API wrapper 520C, also configures and sends a CDService_GetCDInfo message in accordance with the natively-supported RCS resource access protocol for Windows OS to the RCS resources 530C, 705B (e.g., similar to 610A-620A of FIG. 6A). Execution of the CDService_GetCDInfo message by the RCS resources 530C triggers invocation of SIP module 550C to trigger transmission of a message to a remote device or server to query the capabilities of the specified contact(s), 710B, and the remote device or server responds with a 2000K messages that indicates the capabilities of the specified contact(s), 715B. The RCS resources 530C report the capabilities to App1 via a CDLISTENER_CDUPDATE message, 720B. At this point, with the help of RCS API wrapper 520C, App1 translates the native Windows message received at 720B into the cross-platform version which is then recognizable by App1.

As will be appreciated by one of ordinary skill in the art, it would be tedious to provide flowcharts similar to FIGS. 7A-7B on all potential operation systems and/or for all potential RCS resource signaling. For this reason, in lieu of additional Figures, an example look-up table that provides a mapping between cross-platform RCS resource signaling and OS-specific RCS resource signaling for different operating systems is provided below in Table 1. Table 1 is not intended to be an exhaustive list of RCS resource signaling conversions, but is rather provided to help those of ordinary skill in the art to better understand potential use cases in accordance with embodiments of the invention.

TABLE 1

Look-up Table Example for Mapping Between Cross-Platform Signaling and OS-Specific Signaling

| RCS Resource Function | Cross-Platform RCS Resource Signal | Windows OS-specific RCS Resource Signaling flow | Android OS-specific RCS Resource Signaling flow |
|---|---|---|---|
| Instantiate Capability Discovery (CD) Service | CreateCDService* | CreateCDService* -> RCS API Wrapper -> CreateCdService [C-Library such as Windows Library] -> Modem >Network | CreateCDService* -> AIDL -> CreateCdService [Android] -> CreateCdService [C-Library such as Windows Library] -> Modem ->Network |
| Add a new Listener to existing CD service | CDService_Add Listener* | CDService_Add Listener* -> RCS API Wrapper -> CDService_Add Listener [C-Library such as Windows Library] -> Modem >Network | CDService_Add Listener* -> AIDL -> CDService_Add Listener [Android] -> CDService_AddListener [C-Library such as Windows Library] -> Modem ->Network |
| Remove a Listener from existing CD service | RemoveListener CD_SERVICE* | RemoveListener CD_SERVICE* -> RCS API Wrapper -> RemoveListener CD_SERVICE [C-Library such as Windows Library] -> Modem >Network | RemoveListener CD_SERVICE* -> AIDL -> RemoveListener CD_SERVICE [Android] -> RemoveListener CD_SERVICE [C-Library such as Windows Library] -> Modem ->Network |
| Terminate CD Service | DestroyCDService* | DestroyCDService* -> RCS API Wrapper -> DestroyCDService CD_SERVICE [C-Library such as Windows Library] -> Modem >Network | DestroyCDService* -> AIDL -> DestroyCDService CD_SERVICE[Android]-> DestroyCD Service CD_SERVICE [C-Library such as Windows Library] -> Modem ->Network |
| Instantiate IM Service | CreateIMService* | CreateIMService* -> RCS API Wrapper -> CreateIMService [C-Library such as Windows Library] -> Modem >Network | CreateIMService* -> AIDL -> CreateIMService[Android] -> [C-Library such as Windows Library] -> Modem ->Network |
| Add a new Listener to existing IM service | IMService_Add Listener* | IMService_Add Listener* -> RCS API Wrapper -> IMService_Add Listener [C-Library such as Windows Library] -> Modem >Network | IMService_Add Listener* -> AIDL -> IMService_Add Listener [Android] -> IMService_AddListener [C-Library such as Windows Library] -> Modem ->Network |
| Remove a Listener from existing IM service | IMService_Remove Listener* | IMService_Remove Listener* -> RCS API Wrapper -> IMService_Remove Listener* [C-Library such as Windows Library] -> Modem -> Network | IMService_Remove Listener* -> AIDL -> IMService_RemoveListener [Android]-> IMService_RemoveListener [C-Library such as Windows Library] -> Modem ->Network |
| Deliver IM to App1 | IMSession_Send Message( )* | Network -> Modem -> RCS API Wrapper -> IMSession_SendMessage( ) [C-Library such as Windows Library] -> IMSession_Send Message( )*[App1] | Network -> Modem -> AIDL -> IMSession_SendMessage( ) [C-Library such as Windows Library] -> IMSession_SendMessage( ) [Android] -> IMSession_Send Message( )*[App1] |
| Terminate IM Service | DestroyIMService* | DestroyIMService* -> RCS API Wrapper -> DestroyIMService [C-Library such as Windows Library] -> Modem -> Network | DestroyIMService* -> AIDL -> DestroyIMService [Android] -> DestroyIMService [C-Library such as Windows Library] -> Modem ->Network |

Accordingly, as shown in the column "Android OS-specific RCS Resource Signaling flow" for the row "Instantiate Capability Discovery (CD) Service", a cross-platform CreateCDService* message that arrives at the AIDL is mapped or translated by the AIDL into a CreateCDService message that conforms to an Android or Java-format, which can then translated by the AIDL into a CreateCDService message that conforms to a Windows or C-based format (e.g., because C-based programs can be configured for execution on a Linux OS even though Android is primarily Java on the Linux OS), and the AIDL then disseminates the C-based CreateCDService message for delivery to Android-specific RCS resources, which transmits the C-based CreateCDService message to the network via the modem. Likewise, as shown in the column "Windows OS-specific RCS Resource Signaling flow" for the row "Instantiate Capability Discovery (CD) Service", a cross-platform CreateCDService* message that arrives at the RCS API Wrapper is mapped or translated by the RCS API Wrapper into a CreateCDService message that conforms to a Windows or C-based format, and the RCS API Wrapper then disseminates the C-based CreateCDService message for delivery to Windows-specific RCS resources, which transmits the C-based CreateCDService message to the network via the modem.

Thus, the cross-platform CreateCDService* from Table 1 (above) can be mapped and delivered similar to the process of FIG. 6A. In this respect, the cross-platform messages CDService_AddListener*, RemoveListenerCD_SERVICE*, DestroyCDService*, CreateIMService*, IMService_AddListener* and IMService_RemoveListener* are similar, in the sense that these messages originate from an RCS client application (such as App1) and are then translated into the OS-specific RCS resource access protocol for network transmission. However, other types of messages correspond to application-terminated messages that arrive from the network and are then translated into the cross-platform messages, such as IMSession_SendMessage( ) from Table 1 (above), which can be mapped and delivered similar to the process of FIG. 6B.

Again, Table 1 (above) is characterizes a limited set of examples, and other cross-platform RCS resource signaling mappings could relate to addition signals for CD or IM RCS services, or to different types of RCS services altogether (e.g., Image Share, File Transfer or File Share, Configuration Service, Video Share, etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a rich communications suite (RCS) interface provisioned on a client device that is configured with one of a plurality of different operating systems (OSs), comprising:
   receiving, from a given RCS client application among a plurality of RCS client applications on the client device, application-originated RCS signaling in accordance with a given RCS access protocol, the given RCS access protocol configured to be used in a platform-independent manner for communications between RCS client applications and corresponding RCS interfaces provisioned on client devices that are configured with any of the plurality of different OSs;
   translating the received application-originated RCS resource signaling into OS-specific RCS signaling that complies with an OS-specific RCS access protocol for the OS of the client device, the OS-specific RCS access protocol for the OS of the client device being different than one or more other OS-specific RCS access protocols used by one or more other OSs from the plurality of different OSs; and
   delivering the translated RCS resource signaling to a set of RCS resources on the client device that is configured to provide RCS service to the plurality of RCS client applications and to interact in accordance with the OS-specific RCS access protocol.

2. The method of claim 1, wherein the plurality of different OSs include different OS-types and/or different OS-versions of a common OS-type.

3. The method of claim 2, wherein the different OS-types include Windows, iOS and/or Android.

4. The method of claim 3, wherein the different OS-versions of the common OS-type correspond to different versions of the Windows, the iOS and/or the Android OS-types.

5. The method of claim 1, wherein the given RCS access protocol is a multi-OS protocol that is configured to be used in the platform-independent manner on any of the plurality of different OSs.

6. The method of claim 1, wherein the application-originated RCS signaling arrives at the RCS interface within an OS-specific wrapping that is unwrapped by the RCS interface in order to extract the application-originated RCS signaling that complies with the given RCS access protocol.

7. The method of claim 6, wherein the plurality of different OSs include different OS-types and/or different OS-versions of a common OS-type.

8. The method of claim 7, wherein the different OS-types include Windows, iOS and/or Android.

9. The method of claim 8, wherein the different OS-versions of the common OS-type correspond to different versions of the Windows, the iOS and/or the Android OS-types.

10. The method of claim 6, wherein the given RCS access protocol is a multi-OS protocol that is configured to be used in the platform-independent manner on any of the plurality of different OSs.

11. The method of claim 6, wherein the application-originated RCS signaling is associated with one or more of:
   instantiating a capability discovery (CD) service,
   adding a new CD listener to an existing CD service,
   removing an existing CD listener from the existing CD service,
   terminating the existing CD service,
   instantiating a new Instant Messaging (IM) service,
   adding a new IM listener to an existing IM service,
   removing an existing IM listener from the existing IM service,
   terminating the existing IM service,
   exchanging a given IM for the existing IM service with the given RCS client application,
or
   terminating the existing IM service.

12. The method of claim 6, wherein the RCS interface is configured to support RCS-Enhanced (RCS/E) without support for presence or Open Mobile Alliance (OMA) Converged IP Messaging (CPM).

13. The method of claim 6, wherein the RCS interface is configured to support presence and/or Open Mobile Alliance (OMA) Converged IP Messaging (CPM).

14. The method of claim 6, wherein the RCS interface is implemented as a distributed service or a local library.

15. The method of claim 6, wherein the given RCS client application is tested for compatibility with the RCS interface on a simulated version of the OS of the client device prior to deployment of the given RCS client application onto the client device.

16. The method of claim 15, wherein the testing of the given RCS client application includes obtaining Joyn certification for the given RCS client application via a Software Development Kit (SDK) for the given RCS client application that is provided to a developer of the given RCS client application for ensuring compatibility with the RCS interface on the OS of the client device.

17. The method of claim 6, wherein the RCS interface and the given RCS client application are implemented as separate executable modules within the client device.

18. The method of claim 6, wherein the RCS interface is embedded within the given RCS client application such that execution of the given RCS client application occurs in conjunction with the RCS interface and the receiving, translating and delivering occur as part of the conjunctive execution of the RCS interface and the given RCS client application.

19. The method of claim 1, wherein the application-originated RCS signaling is associated with one or more of:
   instantiating a capability discovery (CD) service,
   adding a new CD listener to an existing CD service,
   removing an existing CD listener from the existing CD service,
   terminating the existing CD service,
   instantiating a new Instant Messaging (IM) service,
   adding a new IM listener to an existing IM service,
   removing an existing IM listener from the existing IM service,
   terminating the existing IM service,
   exchanging a given IM for the existing IM service with the given RCS client application,
or
   terminating the existing IM service.

20. The method of claim 1, wherein the RCS interface is configured to support RCS-Enhanced (RCS/E) without support for presence or Open Mobile Alliance (OMA) Converged IP Messaging (CPM).

21. The method of claim 1, wherein the RCS interface is configured to support presence and/or Open Mobile Alliance (OMA) Converged IP Messaging (CPM).

22. The method of claim 1, wherein the RCS interface is implemented as a distributed service or a local library.

23. The method of claim 1, wherein the given RCS client application is tested for compatibility with the RCS interface on a simulated version of the OS of the client device prior to deployment of the given RCS client application onto the client device.

24. The method of claim 23, wherein the testing of the given RCS client application includes obtaining Joyn certification for the given RCS client application via a Software Development Kit (SDK) for the given RCS client application that is provided to a developer of the given RCS client application for ensuring compatibility with the RCS interface on the OS of the client device.

25. The method of claim 1, wherein the RCS interface and the given RCS client application are implemented as separate executable modules within the client device.

26. The method of claim 1, wherein the RCS interface is embedded within the given RCS client application such that execution of the given RCS client application occurs in conjunction with the RCS interface and the receiving, translating and delivering occur as part of the conjunctive execution of the RCS interface and the given RCS client application.

27. A method of operating a rich communications suite (RCS) interface provisioned on a client device that is configured with one of a plurality of different operating systems (OSs), comprising:
receiving, from a set of RCS resources that is configured to provide RCS service to a plurality of RCS client applications on the client device, application-terminated RCS signaling in accordance with an OS-specific RCS access protocol, the OS-specific RCS access protocol for the OS of the client device being different than one or more other OS-specific RCS access protocols used by one or more other OSs from the plurality of different OSs;
translating the received application-terminated RCS resource signaling into RCS signaling that complies with a given RCS access protocol, the given RCS access protocol configured to be used in a platform-independent manner for communications between RCS client applications and corresponding RCS interfaces provisioned on client devices that are configured with any of the plurality of different OSs; and
removing an existing IM listener from the existing IM service,
terminating the existing IM service,
exchanging a given IM for the existing IM service with the given RCS client application,
or
terminating the existing IM service.

28. The method of claim 27, wherein the plurality of different OSs include different OS-types and/or different OS-versions of a common OS-type.

29. The method of claim 28, wherein the different OS-types include Windows, iOS and/or Android.

30. The method of claim 29, wherein the different OS-versions of the common OS-type correspond to different versions of the Windows, the iOS and/or the Android OS-types.

31. The method of claim 27, wherein the given RCS access protocol is a multi-OS protocol that is configured to be used in the platform-independent manner on any of the plurality of different OSs.

32. The method of claim 27, wherein the OS of the client device applies an OS-specific wrapping to the application-terminated RCS signaling such that a wrapped version of the application-terminated RCS signaling arrives at the given RCS client application, wherein the given RCS client application is required to unwrap the wrapped version of the application-terminated RCS signaling in order to extract the application-terminated RCS signaling that complies with the given RCS access protocol.

33. The method of claim 32, wherein the plurality of different OSs include different OS-types and/or different OS-versions of a common OS-type.

34. The method of claim 33, wherein the different OS-types include Windows, iOS and/or Android.

35. The method of claim 34, wherein the different OS-versions of the common OS-type correspond to different versions of the Windows, the iOS and/or the Android OS-types.

36. The method of claim 32, wherein the given RCS access protocol is a multi-OS protocol that is configured to be used in the platform-independent manner on any of the plurality of different OSs.

37. The method of claim 32, wherein the application-terminated RCS signaling is associated with one or more of:
instantiating a capability discovery (CD) service,
adding a new CD listener to an existing CD service,
removing an existing CD listener from the existing CD service,
terminating the existing CD service,
instantiating a new Instant Messaging (IM) service,
adding a new IM listener to an existing IM service,
removing an existing IM listener from the existing IM service,
terminating the existing IM service,
exchanging a given IM for the existing IM service with the given RCS client application,
or
terminating the existing IM service.

38. The method of claim 32, wherein the RCS interface is configured to support RCS-Enhanced (RCS/E) without support for presence or Open Mobile Alliance (OMA) Converged IP Messaging (CPM).

39. The method of claim 32, wherein the RCS interface is configured to support presence and/or Open Mobile Alliance (OMA) Converged IP Messaging (CPM).

40. The method of claim 32, wherein the RCS interface is implemented as a distributed service or a local library.

41. The method of claim 32, wherein the given RCS client application is tested for compatibility with the RCS interface on a simulated version of the OS of the client device prior to deployment of the given RCS client application onto the client device.

42. The method of claim 41, wherein the testing of the given RCS client application includes obtaining Joyn certification for the given RCS client application via a Software Development Kit (SDK) for the given RCS client application that is provided to a developer of the given RCS client application for ensuring compatibility with the RCS interface on the OS of the client device.

43. The method of claim 32, wherein the RCS interface and the given RCS client application are implemented as separate executable modules within the client device.

44. The method of claim 32, wherein the RCS interface is embedded within the given RCS client application such that execution of the given RCS client application occurs in conjunction with the RCS interface and the receiving, translating and delivering occur as part of the conjunctive execution of the RCS interface and the given RCS client application.

45. The method of claim 27, wherein the application-terminated RCS signaling is associated with one or more of:
instantiating a capability discovery (CD) service,
adding a new CD listener to an existing CD service,
removing an existing CD listener from the existing CD service, terminating the existing CD service,
instantiating a new Instant Messaging (IM) service,
adding a new IM listener to an existing IM service,
as part of the conjunctive execution of the RCS interface and the given RCS client application.

46. The method of claim 27, wherein the RCS interface is configured to support RCS-Enhanced (RCS/E) without support for presence or Open Mobile Alliance (OMA) Converged IP Messaging (CPM).

47. The method of claim 27, wherein the RCS interface is configured to support presence and/or Open Mobile Alliance (OMA) Converged IP Messaging (CPM).

48. The method of claim 27, wherein the RCS interface is implemented as a distributed service or a local library.

49. The method of claim 27, wherein the given RCS client application is tested for compatibility with the RCS interface on a simulated version of the OS of the client device prior to deployment of the given RCS client application onto the client device.

50. The method of claim 27, wherein the testing of the given RCS client application includes obtaining Joyn certification for the given RCS client application via a Software Development Kit (SDK) for the given RCS client application that is provided to a developer of the given RCS client application for ensuring compatibility with the RCS interface on the OS of the client device.

51. The method of claim 27, wherein the RCS interface and the given RCS client application are implemented as separate executable modules within the client device.

52. The method of claim 27, wherein the RCS interface is embedded within the given RCS client application such that execution of the given RCS client application occurs in conjunction with the RCS interface and the receiving, translating and delivering occur
delivering the translated RCS resource signaling to a given RCS client application on the client device.

53. A client device that is configured with one of a plurality of different operating systems (OSs) and is provisioned with a rich communications suite (RCS) interface, comprising:
means for receiving, from a given RCS client application among a plurality of RCS client applications on the client device, application-originated RCS signaling in accordance with a given RCS access protocol, the given RCS access protocol configured to be used in a platform-independent manner for communications between RCS client applications and corresponding RCS interfaces provisioned on client devices that are configured with any of the plurality of different OSs;
means for translating the received application-originated RCS resource signaling into OS-specific RCS signaling that complies with an OS-specific RCS access protocol for the OS of the client device, the OS-specific RCS access protocol for the OS of the client device being different than one or more other OS-specific RCS access protocols used by one or more other OSs from the plurality of different OSs; and
means for delivering the translated RCS resource signaling to a set of RCS resources on the client device that is configured to provide RCS service to the plurality of RCS client applications and to interact in accordance with the OS-specific RCS access protocol.

54. The client device of claim 53, wherein the application-originated RCS signaling arrives at the RCS interface within an OS-specific wrapping that is unwrapped by the RCS interface in order to extract the application-originated RCS signaling that complies with the given RCS access protocol.

55. A client device that is configured with one of a plurality of different operating systems (OSs) and is provisioned with a rich communications suite (RCS) interface, comprising:
means for receiving, from a set of RCS resources that is configured to provide RCS service to a plurality of RCS client applications on the client device, application-terminated RCS signaling in accordance with an OS-specific RCS access protocol, the OS-specific RCS access protocol for the OS of the client device being different than one or more other OS-specific RCS access protocols used by one or more other OSs from the plurality of different OSs;
means for translating the received application-terminated RCS resource signaling into RCS signaling that complies with a given RCS access protocol, the given RCS access protocol configured to be used in a platform-independent manner for communications between RCS client applications and corresponding RCS interfaces provisioned on client devices that are configured with any of the plurality of different OSs; and
means for delivering the translated RCS resource signaling to a given RCS client application on the client device.

56. The client device of claim 55, wherein the OS of the client device applies an OS-specific wrapping to the application-terminated RCS signaling such that a wrapped version of the application-terminated RCS signaling arrives at the given RCS client application, wherein the given RCS client application is required to unwrap the wrapped version of the application-terminated RCS signaling in order to extract the application-terminated RCS signaling that complies with the given RCS access protocol.

57. A client device that is configured with one of a plurality of different operating systems (OSs) and is provisioned with a rich communications suite (RCS) interface, comprising:
logic configured to receive, from a given RCS client application among a plurality of RCS client applications on the client device, application-originated RCS signaling in accordance with a given RCS access protocol, the given RCS access protocol configured to be used in a platform-independent manner for communications between RCS client applications and corresponding RCS interfaces provisioned on client devices that are configured with any of the plurality of different OSs;
logic configured to translate the received application-originated RCS resource signaling into OS-specific RCS signaling that complies with an OS-specific RCS access protocol for the OS of the client device, the OS-specific RCS access protocol for the OS of the client device being different than one or more other OS-specific RCS access protocols used by one or more other OSs from the plurality of different OSs; and
logic configured to deliver the translated RCS resource signaling to a set of RCS resources on the client device that is configured to provide RCS service to the plurality of RCS client applications and to interact in accordance with the OS-specific RCS access protocol.

58. The client device of claim 57, wherein the application-originated RCS signaling arrives at the RCS interface within an OS-specific wrapping that is unwrapped by the RCS interface in order to extract the application-originated RCS signaling that complies with the given RCS access protocol.

59. A client device that is configured with one of a plurality of different operating systems (OSs) and is provisioned with a rich communications suite (RCS) interface, comprising:
logic configured to receive, from a set of RCS resources that is configured to provide RCS service to a plurality of RCS client applications on the client device, application-terminated RCS signaling in accordance with an OS-specific RCS access protocol, the OS-specific RCS access protocol for the OS of the client device being different than one or more other OS-specific RCS access protocols used by one or more other OSs from the plurality of different OSs;

logic configured to translate the received application-terminated RCS resource signaling into RCS signaling that complies with a given RCS access protocol, the given RCS access protocol configured to be used in a platform-independent manner for communications between RCS client applications and corresponding RCS interfaces provisioned on client devices that are configured with any of the plurality of different OSs; and logic configured to deliver the translated RCS resource signaling to a given RCS client application on the client device.

60. The client device of claim 59, wherein the OS of the client device applies an OS-specific wrapping to the application-terminated RCS signaling such that a wrapped version of the application-terminated RCS signaling arrives at the given RCS client application, wherein the given RCS client application is required to unwrap the wrapped version of the application-terminated RCS signaling in order to extract the application-terminated RCS signaling that complies with the given RCS access protocol.

61. A non-transitory computer-readable medium containing instructions stored thereon, which, when executed by a client device that is configured with one of a plurality of different operating systems (OSs) and is provisioned with a rich communications suite (RCS) interface, cause the client device to perform operations, the instructions comprising:

at least one instruction to cause the client device to receive, from a given RCS client application among a plurality of RCS client applications on the client device, application-originated RCS signaling in accordance with a given RCS access protocol, the given RCS access protocol configured to be used in a platform-independent manner for communications between RCS client applications and corresponding RCS interfaces provisioned on client devices that are configured with any of the plurality of different OSs;

at least one instruction to cause the client device to translate the received application-originated RCS resource signaling into OS-specific RCS signaling that complies with an OS-specific RCS access protocol for the OS of the client device, the OS-specific RCS access protocol for the OS of the client device being different than one or more other OS-specific RCS access protocols used by one or more other OSs from the plurality of different OSs; and at least one instruction to cause the client device to deliver the translated RCS resource signaling to a set of RCS resources on the client device that is configured to provide RCS service to the plurality of RCS client applications and to interact in accordance with the OS-specific RCS access protocol.

62. The non-transitory computer-readable medium of claim 61, wherein the application-originated RCS signaling arrives at the RCS interface within an OS-specific wrapping that is unwrapped by the RCS interface in order to extract the application-originated RCS signaling that complies with the given RCS access protocol.

63. A non-transitory computer-readable medium containing instructions stored thereon, which, when executed by a client device that is configured with one of a plurality of different operating systems (OSs) and is provisioned with a rich communications suite (RCS) interface, cause the client device to perform operations, the instructions comprising:

at least one instruction to cause the client device to receive, from a set of RCS resources that is configured to provide RCS service to a plurality of RCS client applications on the client device, application-terminated RCS signaling in accordance with an OS-specific RCS access protocol, the OS-specific RCS access protocol for the OS of the client device being different than one or more other OS-specific RCS access protocols used by one or more other OSs from the plurality of different OSs;

at least one instruction to cause the client device to translate the received application- terminated RCS resource signaling into RCS signaling that complies with a given RCS access protocol, the given RCS access protocol configured to be used in a platform-independent manner for communications between RCS client applications and corresponding RCS interfaces provisioned on client devices that are configured with any of the plurality of different OSs; and at least one instruction to cause the client device to deliver the translated RCS resource signaling to a given RCS client application on the client device.

64. The non-transitory computer-readable medium of claim 63, wherein the OS of the client device applies an OS-specific wrapping to the application-terminated RCS signaling such that a wrapped version of the application-terminated RCS signaling arrives at the given RCS client application, wherein the given RCS client application is required to unwrap the wrapped version of the application-terminated RCS signaling in order to extract the application-terminated RCS signaling that complies with the given RCS access protocol.

* * * * *